US006657033B1

(12) United States Patent
Sartori et al.

(10) Patent No.: US 6,657,033 B1
(45) Date of Patent: *Dec. 2, 2003

(54) THERMAL BONDABLE POLYOLEFIN FIBERS COMPRISING A RANDOM COPOLYMER OF PROPYLENE

(75) Inventors: Franco Sartori, Ferrara (IT); Giancarlo Braca, Terni (IT)

(73) Assignee: Basell Poliolefine Italia S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/719,661

(22) PCT Filed: Mar. 24, 2000

(86) PCT No.: PCT/EP00/02674
§ 371 (c)(1),
(2), (4) Date: Feb. 20, 2001

(87) PCT Pub. No.: WO00/63471
PCT Pub. Date: Oct. 26, 2000

(30) Foreign Application Priority Data

Apr. 15, 1999 (EP) .............................. 99201144

(51) Int. Cl.[7] ...................... C08F 210/08; C08F 210/14

(52) U.S. Cl. ................. 526/348.1; 526/348.6; 525/240; 264/210.7; 264/210.8

(58) Field of Search ................. 525/91, 240; 526/348.6, 526/351, 348.1; 264/210.7, 210.8, 464, 176.1, 476, 477; 428/394, 364, 375, 357

(56) References Cited

U.S. PATENT DOCUMENTS

| 4,211,819 A | | 7/1980 | Kunimune et al. ......... 428/374 |
| 5,507,997 A | * | 4/1996 | Evain |
| 6,281,289 B1 | * | 8/2001 | Maugans et al. ............ 525/191 |

FOREIGN PATENT DOCUMENTS

| EP | 0045977 | 2/1982 | ........... C08F/10/00 |
| EP | 0416620 | 3/1991 | ............. B32B/5/26 |
| EP | 0557889 | 9/1993 | ............. D04H/1/42 |
| EP | 0632147 | 1/1995 | ............. D01F/6/06 |
| EP | 0854213 | 7/1998 | ............. D01F/8/06 |
| WO | 9627041 | 9/1996 | .......... D04H/13/00 |
| WO | 9916947 | 4/1999 | ............. D01F/8/06 |

* cited by examiner

Primary Examiner—Robert Harlan

(57) ABSTRACT

The present invention relates to thermal bondable fibers comprising a random polymer of propylene with one or more olefins comonomers different from ethylene, to the process for preparing said fibers, and to the thermally bonded articles obtained from said fibers. Fibers of certain thermoplastic materials are used widely in the manufacturing of thermally bonded products.

12 Claims, No Drawings

THERMAL BONDABLE POLYOLEFIN FIBERS COMPRISING A RANDOM COPOLYMER OF PROPYLENE

This application is the U.S. national phase of International Application PCT/EP00/02674, filed Mar. 24, 2000.

The present invention relates to thermal bondable fibers comprising a random copolymer of propylene with one or more olefin comonomers different from ethylene, to the process for preparing said fibers, and to the thermally bonded articles obtained from said fibers.

Fibers of certain thermoplastic materials are used widely in the manufacturing of thermally bonded products, such as nonwoven articles, by various processes. Said processes are mainly staple carding/calendering, through air-bonded, spunbonding, melt-blown, and any combination of them for composite structures of nonwovens.

There have been various attempts made to improve the thermal bondability (i.e. the bond strength) of fibers and/or the calendering speed, among which the use of random copolymers of propylene has been contemplated.

In particular, according to EP-A-416 620 fabric laminates having layers made of fibers formed from olefin copolymers, terpolymers, and blends of polymers having a crystallinity less than 45% provide improved thermal bonding and therefore improved fabric characteristics. However this document provides a concrete disclosure of propylene-ethylene copolymers only, and points out that said copolymers produce fibers with lower tenacity and lower modulus than those formed from polypropylene.

According to U.S. Pat. No. 4,211,819 heat-melt fibers are obtained by spinning a crystalline propylene terpolymer consisting of specified amounts of propylene, butene-1 and ethylene. However such fibers are used as binder material only, the mechanical properties being conferred by other materials. In fact, when nonwoven fabrics are prepared in the examples, the said fibers are mixed with rayon fibers before calendering.

Therefore it would be advantageous to provide fibers containing olefin copolymers and having an improved thermal bondability associated with high mechanical properties. In the typical process of melt spinning, the polymer is heated in an extruder to the melting point and the molten polymer is pumped under pressure through a spinneret containing a number of orifices of desired diameter, thereby producing filaments of the molten polymer. The molten polymer filaments are fed from the face of the spinneret into a cooling stream of gas, generally air, where these filaments of molten polymer are solidified as a result of cooling to form fibers.

In processes of this kind it would be advantageous to be able to operate with the highest possible spinning speed without impairing the final properties of the so obtained fibers. It has now been found that all the said advantages are obtained by spinning specific random copolymers of propylene.

Accordingly, the present invention provides thermal bondable polyolefin fibers comprising 1% by weight or more, in particular 20% by weight or more, of a random copolymer A) of propylene with one or more comonomers selected from α-olefins of formula $CH_2=CHR$, wherein R is a $C_2-C_8$ alkyl radical, preferably a $C_2-C_6$ alkyl radical, the amount of said comonomer or comonomers being from 3% to 20% by weight with respect to the total weight of the random copolymer A).

From the above definitions it is evident that the term "copolymer" includes polymers containing more than one kind of comonomers.

It has been unexpectedly found that the said fibers have Tenacity values comparable to or higher than the tenacity obtainable by spinning propylene homopolymers under substantially the same conditions, while achieving particularly high values of bond strength at unusually low thermal bonding temperatures.

In particular, the thermal bondable fibers of the present invention are preferably characterized by Tenacity values equal to or higher than 10 cN/Tex (measured as explained in the examples), specially equal to or higher than 15 cN/Tex, for instance from 10 to 60 cN/Tex or from 15 to 60 cN/Tex.

Moreover, the fiber retraction tends to increase with the amount of random copolymer A). This is very important to enhance the self-crimping effect of the fiber. The so obtained high level of self-crimping induces bulkiness in the final nonwovens with higher soft feeling. Also the higher softness contributes, with the soft touch, to improve the final nonwoven quality, in particular for the hygiene applications where the market appreciates very soft nonwovens with clothlike appearance.

Preferred amounts of α-olefins of formula $CH_2=CHR$ (R being a $C_1-C_8$ alkyl) in the random copolymer A) are from 5% to 16% by weight, in particular from 5.5% to 13% by weight. Examples of α-olefins of the above reported formula, present as comonomers in the random copolymer A), are 1-butene, 1-hexene, 4-methyl-1-pentene, 1-octene. Preferred are 1-butene and 1-hexene; particularly preferred is 1-butene.

The presence of substantive amounts of ethylene (indicatively, more than 0.5–1% by weight) in the random copolymer A) is excluded; particularly preferred is a random copolymer A) wherein the comonomer or comonomers present are selected exclusively from the said α-olefins of formula $CH_2=CHR$, wherein R is a $C_1-C_8$ alkyl radical.

Preferably the Melt Flow Rate (MFR, measured according to ISO 1133 at 230° C. with a load of 2.16 Kg) of the random copolymer A) used for preparing the fibers of the present invention is within the range from 5 to 2000 dg/min., more preferably from 10 to 1000 dg/min.

In the fiber the MFR of the random copolymer A) or of the polymer composition comprising the copolymer A) can be higher, depending upon the degree of thermal degradation occurring during the spinning process.

Such values of MFR can undergo even significative variations from the center to the surface of the fiber, depending upon the formation of skin-core structures where the skin, i.e. a more or less thick layer of polymer on the surface of the fiber, has high MFR values caused by the said thermal degradation.

However it has been surprisingly found that the fibers of the present invention do not necessarily require the formation of skin-core structures to achieve high levels of bond strength, even if the formation of a skin-core structure further enhances this property.

It has been found that a particularly good balance of bond strength and mechanical features is obtained when the fibers of the present invention are prepared from random copolymers A) having values of Tensile Strength at yield (measured according to ISO R 527) equal to or higher than 24 MPa, in particular from 24 to 35 MPa, preferably equal to or higher than 25 MPa, more preferably higher than or equal to 26 MPa, in particular from 25 or 26 to 35 MPa.

Even better properties are achieved when the fibers of the present invention are prepared from a polymeric material obtained by subjecting to chemical degradation (visbreaking) a random copolymer A) having the said values of Tensile Strength at yield, or a polymer composition containing the same.

Other preferred features of the random copolymer A) used for preparing the fibers of the present invention are:

- a melting temperature from 135 to 156° C., and a crystallization temperature from 85 to 120° C., both measured by DSC (Differential Scanning Calorimetry) with a temperature variation of 20° C. per minute;
- fraction insoluble in xylene at 25° C. higher than or equal to 93% by weight, more preferably higher than or equal to 95% by weight;
- Polydispersity Index (PI, measured with the method described in the examples) from 2 to 5;
- Flexural Modulus (measured according to ISO 178) from 500 to 1500 MPa;
- Izod Impact Strength (notched) at 23° C. (measured according to ISO 180/1) equal to or higher than 20 KJ/m$^2$;
- Elongation at yield (measured according to ISO R 527) from 8 to 14%;

The ratio of the value of Tensile Strength at yield to the value of Elongation at yield for the random copolymer A), either before or after the said polymer degradation (when occurring) is preferably from 2 to 4, more preferably from 2.1 to 4.

Particularly preferred values of Tenacity for the fibers of the present invention are equal to or higher than 20 cN/Tex, in particular from 20 to 60 cN/Tex; most preferred are values equal to or higher than 25 cN/Tex, in particular from 25 to 60 cN/Tex.

Moreover the fibers of the present invention have preferably Elongation at break values from 80% to 350%, more preferably from 100% to 250% (measured as explained in the examples).

The titre of the fibers is preferably equal to or higher than 0.8 dTex, more preferably from 1 to 10 dTex (measured as explained in the examples). The definition of fibers according to the present invention comprises continuous filaments, cut fibers (staple) and short fibers (the latter being for instance obtained with the melt blown process and preferably having lengths within the range from 5 mm to 100 mm).

The random copolymer A) belongs to the well known family of the random, crystalline or semicrystalline copolymers that can be obtained by way of polymerization processes in the presence of coordination catalysts. Said processes and the copolymers obtained from them are widely described in the art. For example one can use the high yield and highly stereospecific Ziegler-Natta catalysts and the polymerization processes described in EP-A-45977.

The above mentioned MFR values can be obtained by adequately adjusting the molecular weight regulating agent (such as hydrogen, for example) or, as previously said, can be achieved by way of a chemical degradation treatment to which the polymeric material is subjected before or during the preparation of the fibers. An additional contribution to the obtainment of the final MFR of the polymeric material constituting the fiber can be given by the previously said thermal degradation occurring in the preparation of the fiber, particularly when the molten filaments exit from the spinneret into the cooling zone.

The chemical degradation of the polymer chains is carried out by using appropriate and known techniques.

One of said techniques is based on the use of peroxides which are added to the polymeric material in a quantity that allows one to obtain the desired degree of chemical degradation. Such degradation is achieved by bringing the polymeric material at a temperature at least equal to the decomposition temperature of the peroxides.

Preferably, the degree of chemical degradation is from 0.9 to 0.01, expressed in terms of the ratio MFR (1) to MFR (2), where MFR (1) is the value of MFR before degradation, while MFR (2) is the value of MFR after degradation.

The peroxides that are most conveniently employable for the chemical degradation have a decomposition temperature preferably ranging from 150 to 250° C. Examples of said peroxides are the di-tert-butyl peroxide, the dicumyl peroxide, the 2,5-dimethyl-2,5-di(tert-butyl peroxy) hexyne, and the 2,5-dimethyl-2,5-di(tert-butyl peroxy) hexane, which is marketed under the Luperox 101 trade name.

An advantageous embodiment of the present invention is represented by thermal bondable fibers comprising a polyolefin composition C) containing from 1% to 100% by weight, preferably from 20% to 100% by weight, more preferably from 40% to 100% by weight, in particular from 50% to 100% by weight, most preferably from 70% to 100% by weight of the random copolymer A), and from 0% to 99% by weight, preferably from 0% to 80%, more preferably from 0% to 60% by weight, in particular from 0% to 50% by weight, most preferably from 0% to 30% by weight of a polyolefin B) (different from the random copolymer A), in particular as regards the content of comonomers, i.e. not falling in the previously given definition of random copolymer A)).

Generally, the polyolefin B) is selected from polymers or copolymers, and their mixtures, of CH$_2$=CHR olefins where R is a hydrogen atom or a C$_1$–C$_8$ alkyl radical.

Particularly preferred are the following polymers:

1) isotactic or mainly isotactic propylene homopolymers, and homopolymers or copolymers of ethylene, like HDPE, LDPE, LLDPE;

2) crystalline copolymers of propylene with ethylene and/or C$_4$–C$_{10}$ α-olefins, such as for example 1-butene, 1-hexene, 4-methyl-1-pentene, 1-octene, wherein the total comonomer content ranges from 0.05% to 20% by weight with respect to the weight of the copolymer (said copolymers being different from the random copolymer A) as regards the content of comonomers, in particular containing less than 3%, preferably less than 2.5% by weight of C$_4$–C$_{10}$ α-olefins and/or more than 1%, preferably more than 2% by weight of ethylene), or mixtures of said copolymers with isotactic or mainly isotactic propylene homopolymers;

3) elastomeric copolymers of ethylene with propylene and/or a C$_4$–C$_{10}$ α-olefin, optionally containing minor quantities (in particular, from 1% to 10% by weight) of a diene, such as butadiene, 1,4-hexadiene, 1,5-hexadiene, ethylidene-1-norbornene;

4) heterophasic copolymers comprising (I) a propylene homopolymer and/or one of the copolymers of item 2), and an elastomeric fraction (II) comprising one or more of the copolymers of item 3), typically prepared according to known methods by mixing the components in the molten state, or by sequential polymerization, and generally containing the elastomeric fraction (II) in quantities from 5% to 80% by weight;

5) 1-butene homopolymers or copolymers with ethylene and/or other α-olefins.

Moreover, the fibers of the present invention may be single (monocomponent) fibers (i.e. substantially made of the said random copolymer A) or of a composition comprising the random copolymer), like the said composition C)) or composite fibers (i.e. comprising one or more additional portions arranged symmetrically or asymmetrically, for instance side-by-side or sheath-core, comprising various and different kinds of polymeric materials). Preferred examples of polymeric materials that can constitute or be present in the said additional portions are polyethylene, polyisobutylene, polyamides, polyesters, polystyrene, polyvinyl chloride, polyacrylates and mixtures thereof.

The fibers of the present invention can contain formulations of stabilizers suited for obtaining a skin-core structure (skin-core stabilization), or a highly stabilizing formulation. In the latter case, a superior resistance to aging is achieved, for durable nonwovens.

Preferred examples of skin-core stabilizations are those comprising one or more of the following stabilizers (percent by weight with respect to the total weight of polymer and stabilizers):

a) from 0.01% to 0.5% of one or more organic phosphites and/or phosphonites;

b) from 0.005% to 0.5% of one or more HALS (Hindered Amine Light Stabilizer);

and optionally one or more phenolic antioxidants in amounts not higher than 0.02%.

Specific Examples of Phosphites Are:

tris(2,4-di-tert-butylphenyl)phosphite marketed by CIBA GEIGY under the trademark Irgafos 168; distearyl pentaerythritol diphosphite marketed by BORG-WARNER CHEMICAL under the trademark Weston 618; 4,4'-butylidene bis (3-methyl-6-tert-butylphenyl-di-tridecyl) phosphite marketed by ADEKA ARGUS CHEMICAL under the trademark Mark P; tris(mononyl phenyl)phosphite; bis(2,4-di-tert-butyl) pentaerithrytol diphosphite, marketed by BORG-WARNER CHEMICAL under the trademark Ultranox 626.

A preferred example of phosphonites is the tetrakis (2,4-di-tert-butylphenyl) 4,4'-diphenylilenediphosphonite, on which Sandostab P-EPQ, marketed by Sandoz, is based. The HALS are monomeric or oligomeric compounds containing in the molecule one or more substituted amine, preferably piperidine, groups.

Specific examples of HALS containing substituted piperidine groups are the compounds sold by CIBA-GEIGY under the following trademarks:

| | |
|---|---|
| Chimassorb | 944 |
| Chimassorb | 905 |
| Tinuvin | 770 |
| Tinuvin | 292 |
| Tinuvin | 622 |
| Tinuvin | 144 |
| Spinuvex | A36 | and the product sold by American CYANAMID under the trademark Cyasorb UV 3346. Examples of phenolic antioxidants are: tris(4-tert-butyl-3-hydroxy-2,6-dimethylbenzyl)-s-triazine-2–4–6-(1H, 3H, 5H)-trione, marketed by American CYANAMID under the trademark Cyanox 1790; calcium bi [monoethyl(3,5-di-tert-butyl-4-hydroxy-benzyl) phosphonate]; 1,3,5-tris(3,5-di-tert-butyl4-hydroxybenzyl)-s-triazine-2,4,6(1H, 3H, 5H) trione; 1,3,5-trimethyl-2,4,6-tris(3,5-di-tert-butyl4-hydroxybenzyl) benzene; pentaerythrityl-tetrakis [3-(3,5-di-tert-butyl-4-hydroxyphenyl) propionate]; octadecyl 3-(3,5-di-tert-butyl4-hydroxyphenyl)-propionate, marketed by CIBA GEIGY under the trademarks Irganox 1425; Irganox 3114; Irganox 1330; Irganox 1010; Irganox 1076 respectively; 2,6-dimethyl-3-hydroxy4-tert-butyl benzyl abietate.

Illustrative examples of skin-core stabilizations are given in EP-A-391 438.

Preferred examples of highly stabilizing formulations are those containing more than 0.02%, in particular from 0.04 to 0.2% by weight (with respect to the total weight of polymer and stabilizers) of one or more antioxidants, like, for example, phenolic antioxidants.

The above stabilizers can be added to the polymer by means of pelletization or surface coating, or they can be mechanically mixed with the polymer.

Moreover, the fibers of the present invention can contain other additives commonly employed in the art, like anti-slip agents, antistatic agents, flame retardants, fillers, nucleating agents, pigments, anti-soiling agents, photosensitizers.

The fibers of the present invention can be prepared by way of any known process.

In particular, they can be prepared in form of staple fibers, by using both long-spinning and short-spinning apparatuses, or by a spun bond process, with which the fibers are spread to form directly a fiber web and calendered to obtain a nonwoven article, or by a melt blown process.

The long-spinning apparatuses normally comprise a first spinning section where the fibers are extruded and air-cooled in a quenching column at a relatively high spinning speed. Subsequently, these fibers go to the finishing step, during which they are drawn, crimped-bulked and cut. Generally, the above mentioned finishing step is carried out separately with respect to the spinning, in a specific section where the fiber rovings are gathered into one single big roving. Said big roving is then sent to drawing, crimping-bulking and cutting apparatuses which operate at a speed ranging from 100 to 200 m/min.

In other types of long-spinning apparatuses the above mentioned finishing steps are carried out in sequence with the spinning step. In this case the fibers go directly from the gathering to the drawing rollers, where they are drawn at a somewhat contained ratio (not greater than 1.5) at a speed comparable with that of the spinning step.

The process conditions generally adopted when using the long-spinning apparatuses are the following:

output per hole: greater than 0.2 g/min., preferably from 0.15 to 1 g/min., more preferably from 0.2 to 0.5 g/min.;

take up speed: equal to or higher than 500 m/min., preferably from 500 to 3500 m/min., more preferably from 600 to 2000 m/min.;

space where the fibers cool off and solidify after exiting the die: greater than 0.50 m. Moreover, it is preferable that the draw ratio be from 1.1 to 4.

For further details on the long-spinning apparatuses reference is made to Friedelm Hauser "Plastics Extrusion Technology", Hauser Publishers, 1988, chapter 17.

The short-spinning apparatuses allow for a continuous operation, since the spinning speed is compatible with the drawing, crimping and cutting speeds.

The process conditions which are best suited to be used according to the present invention using short-spinning apparatuses are the following.

The output per hole ranges from 0.005 to 0.18 g/min., preferably from 0.008 to 0.07 g/min., more preferably from 0.01 to 0.03 g/min. The take up speed ranges from 30 to 500 m/min., preferably from 40 to 250 m/min., more preferably from 50 to 100 m/min. The draw ratios range from 1.1 to 3.5, preferably from 1.2 to 2.5. Moreover, the fiber cooling and solidification space at the output of the die (cooling space) is preferably greater than 2 mm, more preferably greater than 10 mm, in particular from 10 to 350 mm. Said cooling is generally induced by an air jet or flow.

For further details on the short-spinning apparatuses reference is made to M. Ahmed, "Polypropylene fibers science and technology", Elsevier Scientific Publishing Company (1982) pages 344–346.

The spinning temperature for the above long-spinning and short-spinning apparatuses generally ranges from 220° C. to 310° C., preferably from 250° C. to 300° C.

The equipment used in the process of spunbonding normally includes an extruder with a die on its spinning head, a cooling tower an air suction gathering device that uses Venturi tubes. Underneath this device, that uses air speed to control the take up speed, the filaments are usually gathered over a conveyor belt, where they are distributed forming a web for thermal bonding in a calender.

According to the present invention, when using typical spunbonding machinery, it is convenient to apply the following process conditions.

The output per hole ranges from 0.1 to 2 g/min., preferably from 0.2 to 1 g/min.

The fibers are generally cooled by means of an air flow.

The spinning temperature is generally between 210° C. and 300° C., preferably between 220° C. and 280° C.

The melt blown process uses high velocity hot air to produce fibers of up to 10 microns in diameter and several centimeters long. Under very high air pressure it is possible to produce fibers as fine as 0.3 micron.

Essentially, a polymeric material is passed through an extruder where heat and pressure cause the polymer to melt. The molten polymer then enters the melt blowing die and the die-tip orifices which are about 400 microns in diameter. The polymer emerging from the orifice is attenuated by a jet of high velocity hot air. This allows the polymer to maintain its molten state and attenuate until breaking. As the fiber breaks from the molten stream, the attenuation air forces it into a stream of cooling air where the fiber returns from the molten to the solid state. The fiber ultimately lands on the collector wire with the other fibers and forms a homogeneous matt.

Melt blowing can be carried out vertically downwards or horizontally against a rotating surface, to produce basis weights ranging between 5 and 1000 g/m².

The spinning temperature used in the melt blowing process is typically from 260° C. to 350° C.

As previously said, nonwoven articles are obtained directly from the spun bond process. Another known method for producing thermally bonded articles comprises the production of the staple in a first step, followed by formation of a fiber web by passing the staple fibers through a carding machine, and by thermal bonding by calendering (calender rolls are employed).

It has been surprisingly found that the staple fibers of the present invention display an unusually high cohesion during the carding step and the transportation of the obtained web to the calender rolls, so that high transportation speeds can be adopted without problems.

The staple fibers can also be thermally bonded by the through air bonding process, where a hot air flow is used to achieve the thermal bonding.

Independently from the specific thermal bonding method employed, the bonding temperatures are preferably within the range from 120° C. to 160° C., more preferably from 130° C. to 145° C.

The fibers of the present invention are particularly suited for preparing thermally bonded articles, in particular nonwoven articles, having optimal mechanical properties and high softness.

The said thermally bonded articles can also be obtained from blends of the fibers of the present invention with conventional polyolefin fibers, in particular made of propylene homopolymers.

Moreover, the thermally bonded articles (nonwoven articles) may comprise two or more nonwoven layers. Thanks to the use of the fibers of the present invention, an improved adhesion among the layers is obtained.

Other thermally bonded articles falling in the definition of the present invention are those comprising a nonwoven fabric coupled with a polyolefin film, wherein the nonwoven fabric is made of or comprises the fibers of the present invention, while the polyolefin film may be made of or comprise the polyolefins described before (for instance the random copolymer A) and/or the polyolefin B)).

The coupling between the film and the nonwoven fabric can be obtained for instance by heat treatment in a calender or by using adhesives, like hot melts.

The following examples are given to illustrate and not to limit the present invention.

The data relating to the polymeric materials and the fibers of the examples are determined by way of the methods reported below.

MFR: ISO 1133, 230° C., 2.16 Kg;

Melting and crystallization temperature: by DSC with a temperature variation of 20° C. per minute;

1-butene content: by IR spectroscopy;

Flexural Modulus: ISO 178;

Tensile Strength at yield: ISO R 527;

Elongation at yield: ISO R 527;

Izod Impact Strength (notched) at 23° C.: ISO 180/1;

Polydispersity Index (PI): measurement of molecular weight distribution of the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI = 54.6 \times (\text{modulus separation})^{-1.76}$$

wherein the modulus separation (MS) is defined as:

$$MS = (\text{frequency at } G'=500 \text{ Pa})/(\text{frequency at } G''=500 \text{ Pa})$$

wherein G' is the storage modulus and G" is the low modulus.

Fractions soluble and insoluble in xylene at 25° C.: 2.5 g of polymer are dissolved in 250 ml of xylene at 135° C. under agitation. After 20 minutes the solution is allowed to cool to 25 ° C., still under agitation, and then allowed to settle for 30 minutes. The precipitate is filtered with filter paper, the solution evaporated in nitrogen flow, and the residue dried under vacuum a 80° C. until constant weight is reached. Thus one calculates the percent by weight of polymer soluble and insoluble at room temperature (25° C.).

Titre of fibers: from a 10 cm long roving, 50 fibers are randomly chosen and weighed. The total weight of the said 50 fibers, expressed in mg, is multiplied by 2, thereby obtaining the titre in dTex.

Tenacity and Elongation (at break) of fibers: from a 500 m roving a 100 mm long segment is cut. From this segment the single fibers to be tested are randomly chosen. Each single fiber to be tested is fixed to the clamps of an Instron dinamometer (model 1122) and tensioned to break with a traction speed of 20 mm/min. for elongations lower than 100% and 50 mm/min. for elongations greater than 100%, the initial distance between the clamps being of 20 mm. The Ultimate strength (load at break) and the Elongation at break are determined.

The Tenacity is derived using the following equation:

Tenacity=Ultimate strength $(cN)\times 10$/Titre $(dTex)$

Bond strength of fibers: specimens are prepared from a 400 Tex roving (method ASTM D 1577–7) 0.4 meter long, made up of continuous fibers. After the roving has been twisted eighty times, the two extremities are united, thus obtaining a product where the two halves of the roving are entwined as in a rope. The thermal bonding is carried out on said specimen using a Bruggel HSC-ETK thermal bonding machine, operating at various plate temperatures (see in the tables) using a clamping pressure of 0.28 MPa and 1 second bonding time. The previously said dynamometer, operated at a traction speed of 2 cm/min., is used to measure the average force required to separate the two halves of the roving which constitute each specimen at the thermal bonding point. The obtained graph shows the force varying from minimum to maximum values (peaks are obtained). The value resulting from averaging out all the minimum and maximum values shown in the graph represents the said average force. The result, expressed in cN, is obtained by averaging out at least eight measurements, and represents the bond strength of the fibers.

In alternative, when nonwoven samples are prepared, the bond strength is determined on specimens 20 cm long and 5 cm wide. The 5 cm wide extremities are fixed to the clamps of the dynamometer and tensioned at a clamp speed of 100 mm/min. (the initial distance between the clamps being of 10 cm). The maximum force measured in the Machine Direction (MD) and in the Cross Direction (CD), with respect to the calendering step, represents the strength of the fibers.

Softness of fibers: specimens are prepared from a 400 Tex roving 0.6 m long, made up of continuous fibers. The extremities of the roving are fixed to the clamps of a twist measuring device (Torcimetro Negri e Bossi S.p.A., Milano) and subjected to 120 runs twist. The twisted roving is taken off and the two extremities are united, thus obtaining a product where the two halves of the roving are entwined as in a rope. The so obtained specimens are bent double and the extremities are fixed between the two parallel rolls of a Clark softness tester, leaving a distance of 1 cm between the two halves of the specimen.

Then the two rolls of the tester are jointly rotated rightward and leftward until the specimen reverses its bending direction each time due to the rotation of the plane on which the two rolls lie. The height of the specimen above the two rolls is adjusted so to have the sum of the two angles of plane rotation equal to 90°. The specimen is taken out, cut to the said height and weighed.

The softness value is derived from the following equation:

Softness=$(1/W)\times 100$ where W is the weight, in grams, of the specimen cut to the said height.

POLYMERS SUBJECTED TO SPINNING

Polymers I and Ib

Propylene/1-butene crystalline random copolymers obtained by copolymerizing the monomers in the presence of a high yield, highly stereospecifc Z-N catalyst, and having the following properties:

|  | Polymer I | Polymer Ib |
|---|---|---|
| MFR (dg/min.): | 10.6 | 1.8 |
| Xylene insoluble at 25° C. (% by weight): | 97.6 | 98.1 |
| Melting temperature (° C.): | 141 | 146 |
| Crystallization temperature (° C.): | 91 | 93 |
| 1-butene content (% by weight): | 8.3 | 6.1 |
| PI: | 4 | 3.87 |
| Flexural Modulus (MPa): | 950 | 1250 |
| Tensile Strength at yield (MPa): | 27 | 28 |
| Elongation at yield (%): | 12 | 10 |
| Izod Impact Strength (notched) at 23° C. (KJ/m$^2$) | 4 | 8.1. |

To the said Polymers I and Ib 0.04% by weight of sodium stearate and 0.15% by weight of Irganox B 215 are added by means of pelletization. A paraffinic oil (0.05% by weight with respect to the total weight of polymer and additives) is also added as a dispersing agent for the said additives.

Irganox B 215 is a blend of ⅓ by weight of Irganox 1010 and ⅔ by weight of Irgafos 168.

Polymer Ib is not used as such for spinning.

Polymer II

Obtained by chemical degradation of Polymer I with 0.021% by weight of Luperox 101.

The resulting MFR and PI values are 25.8 dg/min. and 3 respectively.

Polymers III and IV

Obtained by chemical degradation of Polymer Ib with 0.073% by weight (Polymer III) and 0.038% by weight (Polymer IV) of Luperox 101.

The resulting MFR and PI values are respectively 26.8 dg/min. and 2.36 for Polymer III, and 12.5 dg/min. and 2.79 for Polymer IV.

Propylene homopolymers

All the comparative examples are carried out by spinning propylene homopolymers having the MFR and PI values reported in the tables. All the homopolymers contain about 96% by weight of a fraction insoluble in xylene at 25° C.

SPINNING AND CALENDERING APPARATUSES

In all the examples, except for Examples 5,5c, 6 and 6c, a Leonard 25 spinning pilot line with length/diameter ratio of the screw of 5 (built and marketed by Costruzioni Meccaniche Leonard-Sumirago (VA)) is used.

In Examples 5 and 5c a semi industrial short-spinning line is used, with a spinneret having 65000 holes and a central quenching air device (quenching temperature: about 19° C.).

In Examples 6 and 6c a high speed carding/calendering plant is used.

The maximum speed values reported in the following tables are the highest take up speeds at which a reduced number of fibers is broken after 30 minutes (this number is given in the tables as "No of breaks at max. speed/30'").

EXAMPLES 1 AND 2 AND COMPARISON 1c AND 2c

It is operated under the long-spinning conditions reported in Table 1.

The space between the exit of the die and the point at which the filaments come into contact with the quenching air is of 10 cm.

The fibers of Examples 1 and 2 are obtained by spinning the above said Polymer 1, while those of Comparison Examples 1c and 2c are obtained by spinning homopolymers having a skin-core stabilization, as demonstrated by the sensibly increased MFR values in the spun fibers (fiber MFR).

The characterization of the fibers so obtained is reported in Table 1 as well.

TABLE 1

| Example No. | | 1 | 2 | 1c | 2c |
|---|---|---|---|---|---|
| Polymer MFR | dg/min | 10.6 | 10.6 | 18.8 | 12.0 |
| PI | | 4.0 | 4.0 | 3.95 | 3.94 |
| Head T | °C. | 260 | 265 | 270 | 280 |
| T melt | °C. | 267 | 273 | 278 | 293 |
| Head pressure | Bar | 36 | 35 | 25 | 38 |
| Hole diameter | mm | 0.4 | 0.4 | 0.4 | 0.4 |
| Output per hole | g/min | 0.4 | 0.4 | 0.4 | 0.4 |
| n. holes in the die | u | 61 | 61 | 61 | 61 |
| Quenching T | °C. | 24.6 | 23.4 | 21.6 | 20.0 |
| Take up speed | m/min | 1500 | 1500 | 1500 | 1500 |
| Fiber MFR | dg/min | 17.8 | 18.8 | 87 | 94 |
| Maximum speed | m/min | 3900 | 3900 | 3900 | 3900 |
| No. of breaks at max. speed/30' | u | 0 | 1 | 5 | 1 |
| ONLINE ORIENTATION | | | | | |
| I roll speed | m/min | 1500 | 1500 | 1500 | 1500 |
| I roll temperature | °C. | 50 | 50 | 50 | 50 |
| II roll speed | m/min | 2250 | 2250 | 2250 | 2250 |
| II roll temperature | °C. | 110 | 110 | 110 | 110 |
| III roll speed | m/min | 2250 | 2250 | 2250 | 2250 |
| III roll temperature | °C. | 90 | 90 | 90 | 90 |
| Draw ratio | | 1:1.5 | 1:1.5 | 1:1.5 | 1:1.5 |
| ORIENTED FIBER CHARACTERIZATION | | | | | |
| Titre | DTex | 2.35 | 2.10 | 1.95 | 2.00 |
| Tenacity | cN/Tex | 26 | 27.9 | 18.2 | 19.2 |
| Elongation | % | 235 | 230 | 350 | 395 |
| Softness | 1/g | 850 | | 750 | |
| Bond strength (150° C.) | CN | 895 ± 110 | 995 ± 135 | 540 ± 150 | 380 ± 69 |
| Bond strength (145° C.) | CN | 630 ± 110 | 540 ± 115 | 295 ± 51 | — |
| Bond strength (140° C.) | CN | 315 ± 40 | 315 ± 35 | 20 ± 17 | — |

Notes head T and head pressure are the temperature and pressure measured on the spinning head;

for the bond and strength measurements, the temperature at which thermal bonding occurred is given between brackets.

EXAMPLES 3 AND 4 AND COMPARISON 3c AND 4c

It is operated under the long-spinning conditions reported in Table 2.

The space between the exit of the die and the point at which the filaments enter into contact with the quenching air is of 10 cm.

The fibers of Examples 3 and 4 are obtained by spinning the above said Polymer IV, those of Comparison Examples 3c and 4c by spinning propylene homopolymers having a skin-core stabilization and a stronger stabilization (for spun bonding) respectively.

The characterization of the fibers so obtained is reported in Table 2 as well.

TABLE 2

| Example No. | | 3 | 4 | 3c | 4c |
|---|---|---|---|---|---|
| polymer MFR | dg/min | 12.5 | 12.5 | 12.0 | 12.3 |
| PI | | 2.79 | 2.79 | 3.92 | 2.65 |
| head T | °C. | 270 | 280 | 280 | 285 |
| T melt | °C. | 277 | 287 | 290 | 292 |
| head pressure | Bar | 28 | 24 | 29 | 26 |
| hole diameter | mm | 0.4 | 0.4 | 0.4 | 0.4 |
| output per hole | g/min | 0.4 | 0.4 | 0.4 | 0.4 |
| n. holes in the die | u | 61 | 61 | 61 | 61 |
| quenching T | °C. | 23.6 | 24.5 | 17.0 | |
| take up speed | m/min | 1500 | 1500 | 1500 | 1500 |
| fiber MFR | dg/min | 18 | 20.5 | 75 | 19.4 |
| maximum speed | m/min | 4200 | 4500 | 4200 | 2700* |
| No. of breaks at max. speed/30' | u | 1 | 0 | 0 | 0 |
| ONLINE ORIENTATION | | | | | |
| I roll speed | m/min | 1500 | 1500 | 1500 | 1500 |
| I roll temperature | °C. | 50 | 50 | 50 | 50 |
| II roll speed | m/min | 2250 | 2250 | 2250 | 2250 |
| II roll temperature | °C. | 110 | 110 | 110 | 110 |
| III roll speed | m/min | 2250 | 2250 | 2250 | 2250 |
| III roll temperature | °C. | 90 | 90 | 90 | 90 |
| Draw ratio | | 1:1.5 | 1:1.5 | 1:1.5 | 1:1.5 |
| ORIENTED FIBER CHARACTERIZATION | | | | | |
| Titre | dTex | 1.95 | 1.8 | 2.20 | 1.85 |
| Tenacity | cN/Tex | 48.6 | 55.3 | 20.7 | 36.1 |
| Elongation | % | 110 | 105 | 350 | 150 |
| Softness | 1/g | 1030 | 1055 | 795 | |
| Bond strength (150° C.) | cN | 315 | 310 | 350 | 170 |

*7 breaks at 3000 m/min in 10 minutes

EXAMPLES 5 AND COMPARISON 5c

In Example 5 the above said Polymer I is spun into fibers by operating with a first Godet speed of 108 m/min., a second Godet speed of 134 m/min., an output of 90 Kg/h, and a head temperature of 310° C. No spinneret fouling occurred, and no output limitation was evidenced.

In Comparison Example 5c the same propylene homopolymer as in Comparison Example 2c is spun into fibers by operating with a first Godet speed of 103 m/min., a second Godet speed of 134 m/min., an output of 90 Kg/h and a head temperature of 320° C.

The draw ratios and the characterization of the fibers so obtained are reported in Table 3.

TABLE 3

| Example No. | | 5 | 5c |
|---|---|---|---|
| Draw ratio | | 1.24 | 1.3 |
| TITRE | dTex | 2.35 | 2.42 |
| Tenacity | cN/tex | 22 | 20 |
| Elongation | % | 240 | 300 |
| Bond strength at 150° C. | Cn | — | 250 |
| Bond strength at 140° C. | cN | 1135 | 150 |
| Bond strength at 135° C. | cN | 765 | — |
| Bond strength at 130° C. | cN | 410 | — |

EXAMPLES 6 AND COMPARISON 6c

The fibers of Example 5 and Comparison Example 5c are thermally bonded in Example 6 and Comparison Example 6c respectively, by carding/calendering under the conditions reported in Table 4, thereby obtaining 20 g/m² nonwovens.

The Tenacity values of the so obtained nonwovens are reported in Table 4 as well.

TABLE 4

| Example No. | Calendering temperature °C. | Conveyor belt speed m/min | MD Tenacity N/5 cm | CD Tenacity N/5 cm |
|---|---|---|---|---|
| 6 | 137 | 140 | 55 | 5.4 |
| 6c | 155 | 140 | 40 | 4.0 |

EXAMPLES 7–14 AND COMPARISON 7–10c

It is operated under the spun bonding conditions reported in Tables 5 to 7.

The fibers of Examples 7–14 are obtained by spinning the following polymers:

| Example | Polymer |
|---|---|
| 7 | I |
| 8 | III |
| 9 | III |
| 10 | III |
| 11 | II |
| 12 | IV |
| 13 | IV |
| 14 | IV |

In Comparison Examples 7c–10c propylene homopolymers with a spun bonding stabilization are used.

TABLE 5

| Example No | | 7 | 7c | 8c |
|---|---|---|---|---|
| Polymer MFR | Dg/min | 10.6 | 12.0 | 23.9 |
| PI | | 4.0 | 2.74 | 2.58 |
| Head T | °C. | 270 | 285 | 250 |
| T melt | °C. | 277 | 292 | 258 |
| Head pressure | Bar | 27 | 24 | 21 |
| Hole diameter | Mm | 0.6 | 0.6 | 0.6 |
| Output per hole | g/min | 0.6 | 0.6 | 0.6 |
| n. holes in the die | u | 37 | 37 | 37 |
| Quenching T | °C. | 23.1 | 22.4 | 20.6 |
| Take up speed | m/min | 1500 | 1500 | 1500 |
| Fiber MFR | Dg/min | 20.7 | 17.8 | 33.5 |
| Maximum speed | m/min | 4200 | 4200 | 4500 |
| No. of breaks at max. speed/30' | U | 2 | 3 | 2 |
| Take up speed | m/min | 3600 | 3600 | 3600 |
| Titre single fiber | Dtex | 1.8 | 1.75 | 1.75 |

TABLE 5-continued

| Example No | | 7 | 7c | 8c |
|---|---|---|---|---|
| Elongation | % | 315 | 325 | 280 |
| Tenacity | CN/Tex | 21.9 | 23.6 | 21.2 |
| Softness | 1/g | 1150 | 900 | 925 |
| Bond strength (150° C.) | CN | — | 150 ± 25 | 180 ± 20 |
| Bond strength (140° C.) | CN | 920 ± 70 | — | — |

TABLE 6

| Example No | | 8 | 9 | 10 | 11 | 9c |
|---|---|---|---|---|---|---|
| Polymer MFR | dg/min | 26.8 | 26.8 | 28.8 | 25.8 | 23.9 |
| PI | | 2.36 | 2.36 | 2.36 | 3.0 | 2.58 |
| Head T | °C. | 240 | 250 | 230 | 250 | 250 |
| T melt | °C. | 249 | 258 | 237 | 258 | 258 |
| Head pressure | Bar | 22 | 20 | 25 | 21 | 21 |
| Hole diameter | mm | 0.6 | 0.6 | 0.6 | 0.6 | 0.6 |
| Output per hole | g/min | 0.6 | 0.6 | 0.6 | 0.6 | 0.6 |
| n. holes in the die | u | 37 | 37 | 37 | 37 | 37 |
| Quenching T | °C. | 24.1 | 24.3 | 24.1 | 20.6 | 20.6 |
| Take up speed | m/min | 1500 | 1500 | 1500 | 1500 | 1500 |
| Fiber MFR | dg/min | 32.2 | 33.6 | 32.5 | 32.9 | 33.5 |
| Maximum speed | m/min | 4200 | 4200 | 4200 | 4200 | 4500 |
| No. of breaks at max. speed/30' | u | 1 | 3 | 1 | 3 | 2 |
| Take up speed | m/min | 3600 | 3600 | 3600 | 3600 | 3800 |
| Titre single fiber | dTex | 1.75 | 1.80 | 1.95 | 1.90 | 1.75 |
| Elongation | % | 230 | 140 | 235 | 275 | 280 |
| Tenacity | cN/Tex | 23.4 | 20.1 | 20.6 | 20.3 | 21.2 |
| Softness | 1/g | 1085 | — | — | 1010 | 925 |
| Bond strength (150° C.) | cN | Mold | — | — | — | 180 |
| Bond strength (145° C.) | cN | 675 | — | — | — | — |
| Bond strength (140° C.) | cN | 290 | — | — | 850 | — |

TABLE 7

| Example No | | 12 | 13 | 14 | 10c |
|---|---|---|---|---|---|
| Polymer MFR | dg/min | 12.5 | 12.5 | 12.5 | 12.0 |
| PI | | 2.79 | 2.79 | 2.79 | 2.74 |
| Head T | °C. | 285 | 270 | 280 | 285 |
| T melt | °C. | 291 | 277 | 287 | 292 |
| Head pressure | Bar | 18 | 28 | 24 | 24 |
| Hole diameter | Mm | 0.6 | 0.4 | 0.4 | 0.6 |
| Output per hole | g/min | 0.6 | 0.4 | 0.4 | 0.6 |
| n. holes in the die | U | 37 | 61 | 61 | 37 |
| Quenching T | °C. | 24.8 | 23.6 | 24.1 | 22.4 |
| Take up speed | m/min | 1500 | 1500 | 1500 | 1500 |

TABLE 7-continued

| Example No | | 12 | 13 | 14 | 10c |
|---|---|---|---|---|---|
| Fiber MFR | dg/min | 27.9 | 17.1 | 20.9 | 17.8 |
| Maximum speed | m/min | 4200 (4500) | 4200 | 4500 | 4200 |
| No. of breaks at max speed/30' | U | 0(5) | 1 | 0 | 3 |
| Take up speed | m/min | 3600 | 3600 | 3600 | 3600 |
| Titre single fiber | DTex | 1.75 | 1.15 | 1.15 | 1.75 |
| Elongation | % | 210 | 220 | 200 | 325 |
| Tenacity | cN/Tex | 25.2 | 30.8 | 31.8 | 23.6 |
| Softness | 1/g | 1085 | 1045 | 1115 | 900 |
| Bond strength (150° C.) | CN | 930 | — | — | 150 ± 25 |
| Bond strength (145° C.) | CN | 605 | — | — | — |
| Bond strength (140° C.) | CN | 255 | — | — | — |

EXAMPLES 15–22 AND COMPARISON 11c

Further spinning tests were performed in the Leonard 25 spinning pilot line with length/diameter ratio of the screw of 5 (built and marketed by Costruzioni Meccaniche Leonard-Sumirago (VA)) in the typical conditions for thermal Bonding staple. Online orientation adopted is the typical stretch ratio for Hygiene applications.

A homopolymer for thermal bonding staple, having PI=3.91, MFR=11.6 and Xylene soluble 4.1% wt, and a typical additive package to induce skin/core structure in the filament, was spun in pure as reference. The main conditions are reported in Table 8.

The random copolymer is the Polymer I previously described and has a typical additive package for thermal bonding staple (to induce skin/core structure in the filament).

It was tested in dry blend with the said homopolymer in different percentage (spinning Examples N. 15–22) and in pure (Ex. N. 11c). In table 8 are reported all the results. The blends were spun at lower temperature (270° C. vs. 280° C.) due to the lower melting temperature of the random copolymer.

In particular, Softness, Bonding strength, Fibre Tenacity increase with the amount of random copolymer. Surprisingly, even at 2% wt. of random copolymer the blend exhibits a sudden rise of the properties.

Elongation is lower the higher the Tenacity due to the higher filament orientation induced by the random copolymer.

Spinnability is fully suitable for the application in all the cases.

A Thermofil internal test apparatus is used to measure the filament retraction at a selected temperature (generally 130° C.).

The filament is clamped without any pretension imposed and placed at 130° C. for 600 seconds.

The variation of the length (usually contraction) in percentage with respect to the initial length amounts to the retraction.

TABLE 8

| Example N. | | 11c | 15 | 16 | 17 | 18 | 19 | 20 | 21 | 22 |
|---|---|---|---|---|---|---|---|---|---|---|
| Polymer I amount | % wt | 0 | 2 | 5 | 10 | 15 | 20 | 30 | 50 | 100 |
| polymer MFR | dg/min | 11.6 | 11.6 | 11.6 | 11.6 | 11.6 | 11.3 | 11.0 | 11.0 | 10.7 |
| PI | | 3.91 | 4.0 | 4.0 | 4.0 | 4.0 | 4.0 | 4.0 | 4.0 | 4.0 |
| head T | ° C. | 280 | 270 | 270 | 270 | 270 | 270 | 270 | 270 | 270 |
| T melt | ° C. | 290 | 281 | 280 | 280 | 280 | 280 | 280 | 279 | 280 |
| head pressure | Bar | 24 | 29 | 29 | 30 | 31 | 29 | 30 | 32 | 32 |
| hole diameter | mm | 0.4 | 0.4 | 0.4 | 0.4 | 0.4 | 0.4 | 0.4 | 0.4 | 0.4 |
| output per hole | g/min | 0.4 | 0.4 | 0.4 | 0.4 | 0.4 | 0.4 | 0.4 | 0.4 | 0.4 |
| n. holes in the die | u | 61 | 61 | 61 | 61 | 61 | 61 | 61 | 61 | 61 |
| quenching T | ° C. | 17.7 | 19.3 | 19.5 | 19.9 | 18.5 | 18.2 | 18.3 | 19.8 | 21.6 |
| take up speed | m/min | 1500 | 1500 | 1500 | 1500 | 1500 | 1500 | 1500 | 1500 | 1500 |
| fiber MFR | dg/min | 109 | 60.4 | 56.9 | 57.2 | 58.2 | — | — | 62 | 72 |
| maximum speed | m/min | 3900 | 3600 | 3900 | 3600 | 3600 | 3900 | 3600 | 3900 | 4200 |
| No. of breaks at max. speed/30' ONLINE ORIENTATION | u | 3 | 2 | 3 | 2 | 1 | 0 | 0 | 1 | 0 |
| I roll speed | m/min | 1500 | 1500 | 1500 | 1500 | 1500 | 1500 | 1500 | 1500 | 1500 |
| I roll temperature | ° C. | 50 | 50 | 50 | 50 | 50 | 50 | 50 | 50 | 50 |
| II roll speed | m/min | 2250 | 2250 | 2250 | 2250 | 2250 | 2250 | 2250 | 2250 | 2250 |
| II roll temperature | ° C. | 110 | 110 | 110 | 110 | 110 | 110 | 110 | 110 | 110 |
| III roll speed | m/min | 2250 | 2250 | 2250 | 2250 | 2250 | 2250 | 2250 | 2250 | 2250 |
| III roll temperature | ° C. | 90 | 90 | 90 | 90 | 90 | 90 | 90 | 90 | 90 |
| Draw ratio ORIENTED FIBER CHARACTERIZATION | | 1:1.5 | 1:1.5 | 1:1.5 | 1:1.5 | 1:1.5 | 1:1.5 | 1:1.5 | 1:1.5 | 1:1.5 |
| Titre | dTex | 1.95 | 2.0 | 2.0 | 1.90 | 1.85 | 2.00 | 2.00 | 1.90 | 1.9 |
| Tenacity | cN/Tex | 20 | 20.1 | 23.5 | 25.5 | 25.1 | 26.1 | 28.1 | 31.0 | 34.0 |
| Elongation | % | 225 | 300 | 310 | 270 | 270 | 250 | 200 | 245 | 145 |

TABLE 8-continued

| Example N. | | 11c | 15 | 16 | 17 | 18 | 19 | 20 | 21 | 22 |
|---|---|---|---|---|---|---|---|---|---|---|
| Softness | 1/g | 750 | 905 | 1010 | 975 | 975 | 1000 | 920 | 960 | 1030 |
| Bond strength (150° C.) | cN | 620 ± 100 | 750 ± 110 | 730 ± 135 | 780 ± 193 | 820 ± 150 | 850 ± 227 | 920 ± 227 | 930 ± 320 | 1010 ± 227 |
| Retraction at 130° C. | % | 6 | 6 | 6 | 6 | 6.5 | 7.0 | 7.5 | 8.0 | 10 |

Polymer I was used pure and in blend in Short spinning process to produce staple for Hygiene.

Staple was thermobonded at different calendering temperatures (Temp.(C)-1=Flat roller temp.), Temp.(C)-2=Embossing roller temp.) in comparison with homopolymers staple produced by Long spinning process (much more effective to produce Skin/Core filament structure/enhance thermobondability than the Short spinning).

Line speed 80m/min (speed of Machine direction web production)

A. 100% Polymer I by Short Spinning Staple

| Temp. (C)-1 | Temp. (C)-2 | Web Wt. (g/m$^2$) | MD (Kg) | MD Elong. (%) | CD (Kg) | CD Elong. (%) |
|---|---|---|---|---|---|---|
| 155 | 154 | 21.8 | 3.12 | 34.5 | 0.92 | 67.5 |
| 155 | 149 | 21 | 3.14 | 49.3 | 0.94 | 94.6 |
| 152 | 146 | 22 | 3.81 | 49.1 | 0.87 | 96.1 |
| 149 | 143 | 22.4 | 4.45 | 67.6 | 0.86 | 100.2 |
| 146 | 140 | 22.8 | 4.49 | 74.6 | 0.66 | 84.6 |

B. 70% Polymer I+30% homopolymer by Short Spinning Staple

| Temp. (C)-1 | Temp. (C)-2 | Web Wt. (g/m$^2$) | MD (Kg) | MD Elong. (%) | CD (Kg) | CD Elong. (%) |
|---|---|---|---|---|---|---|
| 164 | 158 | 21.9 | 3.59 | 49.7 | 0.87 | 92.8 |
| 161 | 155 | 21.7 | 4.01 | 58.2 | 0.94 | 113.1 |
| 158 | 152 | 21.2 | 4.06 | 66.3 | 0.79 | 103.4 |
| 155 | 150 | 22 | 3.79 | 65.7 | 0.84 | 123.3 |
| 152 | 146 | 21.2 | 3.81 | 71.5 | 0.53 | 83.1 |

C. 50% Polymer I+50% homopolymer by Short Spinning Staple

| Temp. (C)-1 | Temp. (C)-2 | Web Wt. (g/m$^2$) | MD (Kg) | MD Elong. (%) | CD (Kg) | CD Elong. (%) |
|---|---|---|---|---|---|---|
| 152 | 146 | 21 | 3.23 | 65.5 | 0.36 | 65.5 |
| 155 | 150 | 21.1 | 3.71 | 69.8 | 0.62 | 89.2 |
| 158 | 152 | 22 | 3.69 | 58.4 | 0.84 | 108.9 |
| 161 | 155 | 21.5 | 3.69 | 55.3 | 0.81 | 109.6 |
| 164 | 158 | 21.7 | 3.69 | 46.9 | 0.76 | 87.9 |

D. 100% homopolymer by Short Spinning Staple ref N.1

| Typical values | Web Wt. (g/m$^2$) | MD (Kg) | MD Elong. (%) | CD (Kg) | CD Elong. (%) |
|---|---|---|---|---|---|
|  | 21 | 3.3 | 90.0 | 0.7 | 80 |

E. 100% homopolymer by Long Spinning Staple ref. N.2

| Typical values | Web Wt. (g/m²) | MD (Kg) | MD Elong. (%) | CD (Kg) | CD Elong. (%) |
|---|---|---|---|---|---|
| | 21 | 3.6 | 90.0 | 1.0 | 85 |

Staple fibres produced by Short Spinning process using Polymer I pure or in blend with homopolymer can compete with Long Spinning Staple fibres (more expensive and delicate process) during the web preparation by carding thermobonding.

What is claimed is:

1. Thermal bondable polyolefin fibers comprising 1% by weight or more of a random copolymer A) of propylene with one or more comonomers selected from α-olefins of formula $CH_2=CHR$, wherein R is a $C_2$–$C_8$ alkyl radical, the amount of said comonomer or comonomers being from 3% to 20% by weight with respect to the total weight of the random copolymer A).

2. The fibers of claim 1, having Tenacity values equal to or higher than 10 cN/Tex.

3. The fibers of claims 1 or 2, comprising a polyolefin composition C) containing from 20% to 100% by weight of the random copolymer A) and from 0% to 80% by weight of a polyolefin B) selected from polymers or copolymers, and their mixtures, of $CH_2=CHR$ olefins where R is hydrogen or a $C_1$–$C_8$ alkyl radical.

4. The fibers of claim 1, obtained from a random copolymer A) having a value of Tensile Strength at yield equal to or higher than 24 Mpa, or from a polyolefin composition comprising such copolymer A).

5. The fibers of claim 1, obtained from a polymeric material resulting from the chemical degradation of a random copolymer A) having a value of Tensile Strength at yield equal to or higher than 24 Mpa, or from the chemical degradation of a polyolefin composition comprising such copolymer A).

6. The fibers of claim 1, in form of single or composite fibers.

7. A process for preparing the fibers of claim 1, by spinning the random copolymer A), or by spinning a polyolefin composition comprising 1% by weight or more of such copolymer A).

8. Thermally bonded articles comprising the fibers of claim 1.

9. The thermally bonded articles of claim 8, in form of nonwoven articles.

10. The nonwoven articles of claim 9, comprising two or more nonwoven layers.

11. The thermally bonded articles of claim 8, comprising a nonwoven fabric coupled with a polyolefin film.

12. The fibers of claim 2 further comprising a polyolefin composition C) containing from 20% to 100% by weight of the random copolymer A) and from 0% to 80% by weight of a polyolefin B) selected from polymers or copolymers, and their mixtures, of $CH_2=CHR$ olefins where R is hydrogen or a $C_1$–$C_8$ alkyl radical.

* * * * *